Figure 1:
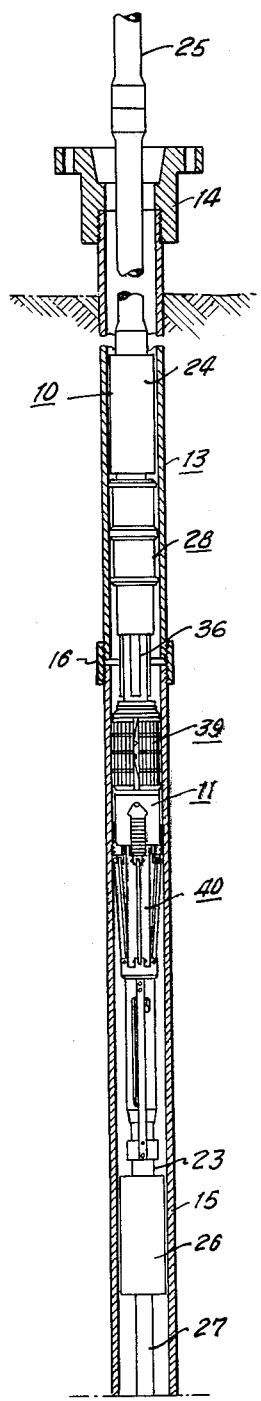

INVENTOR
Harvey W. Ensminger

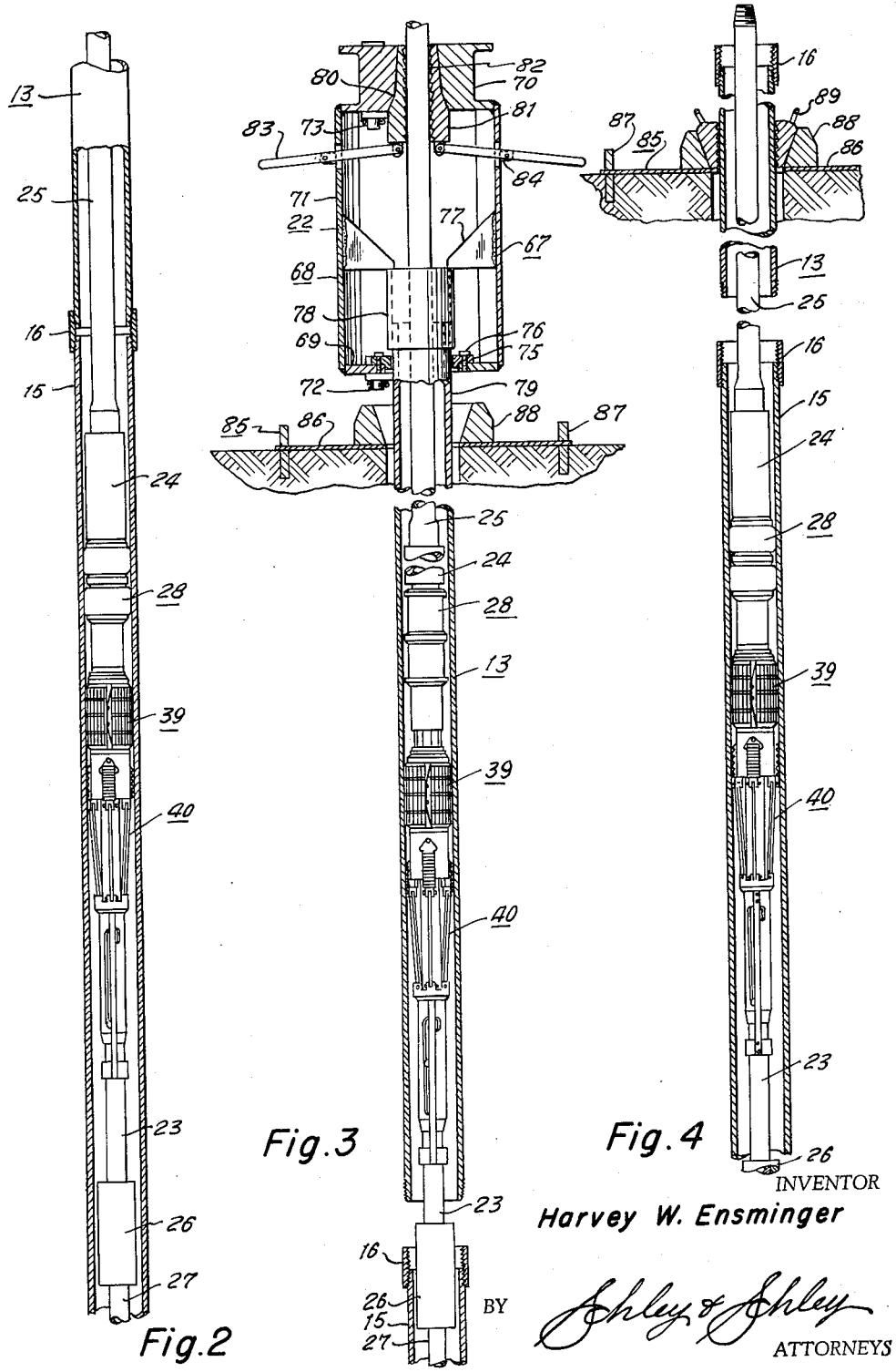

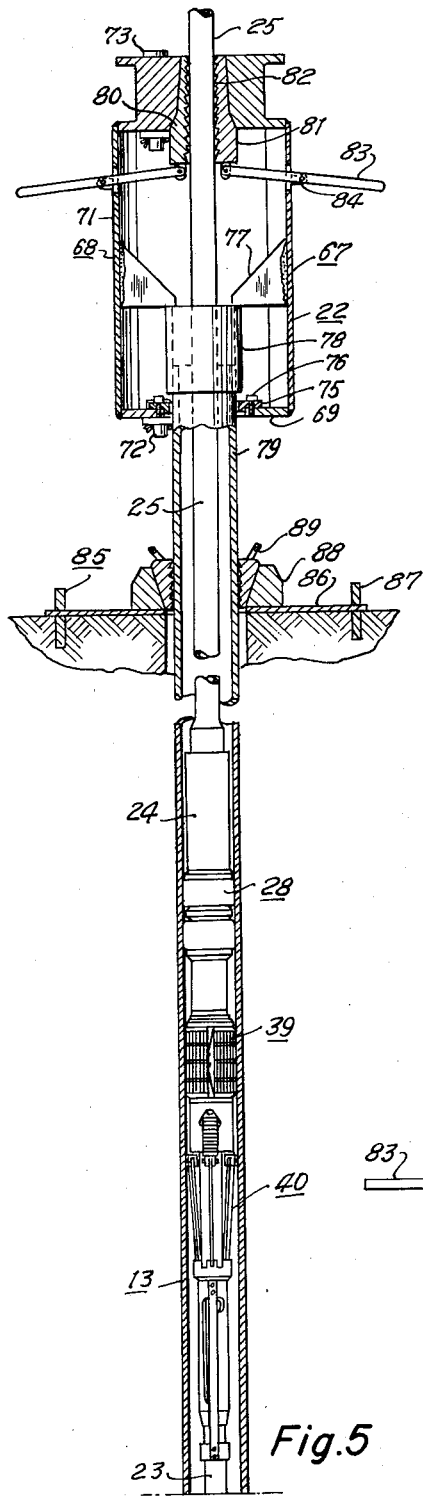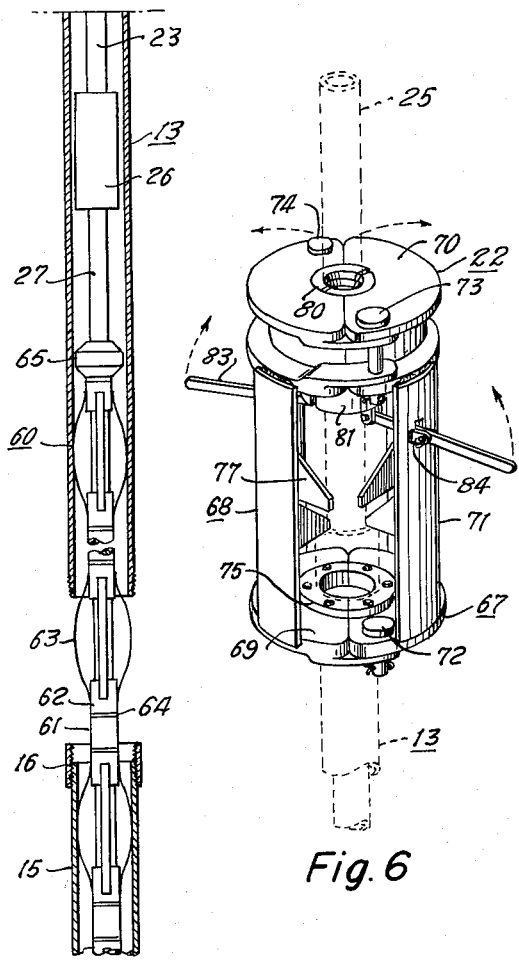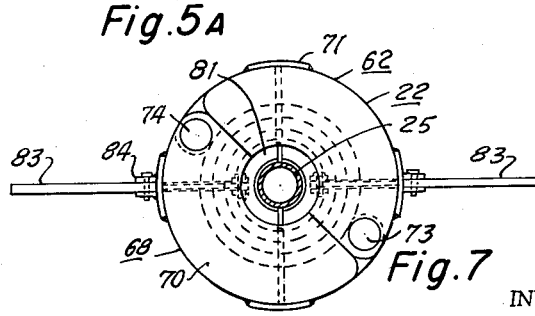
Fig. 5
Fig. 5A
Fig. 6
Fig. 7
INVENTOR
Harvey W. Ensminger
BY Ashley & Ashley
ATTORNEYS

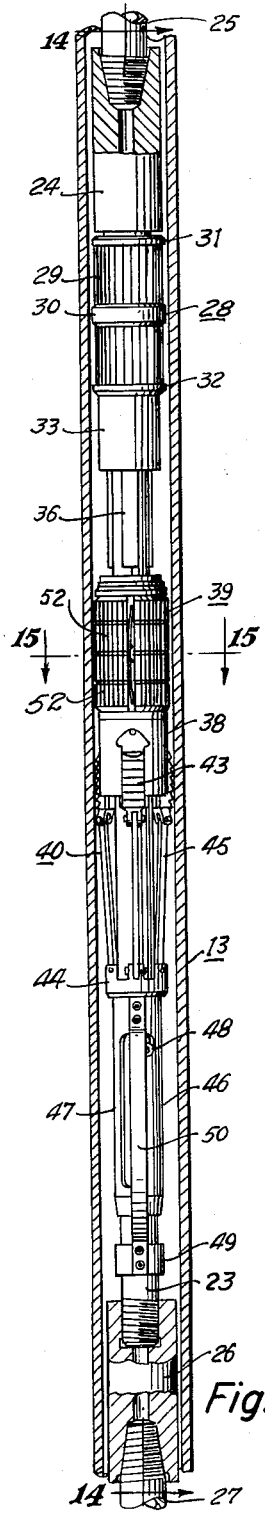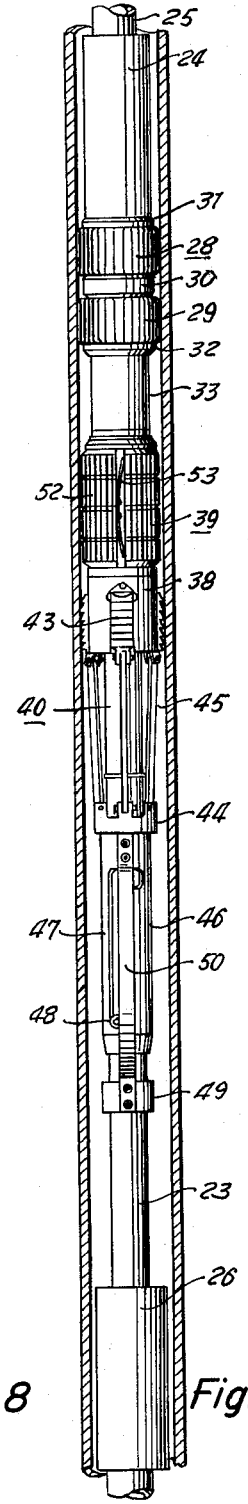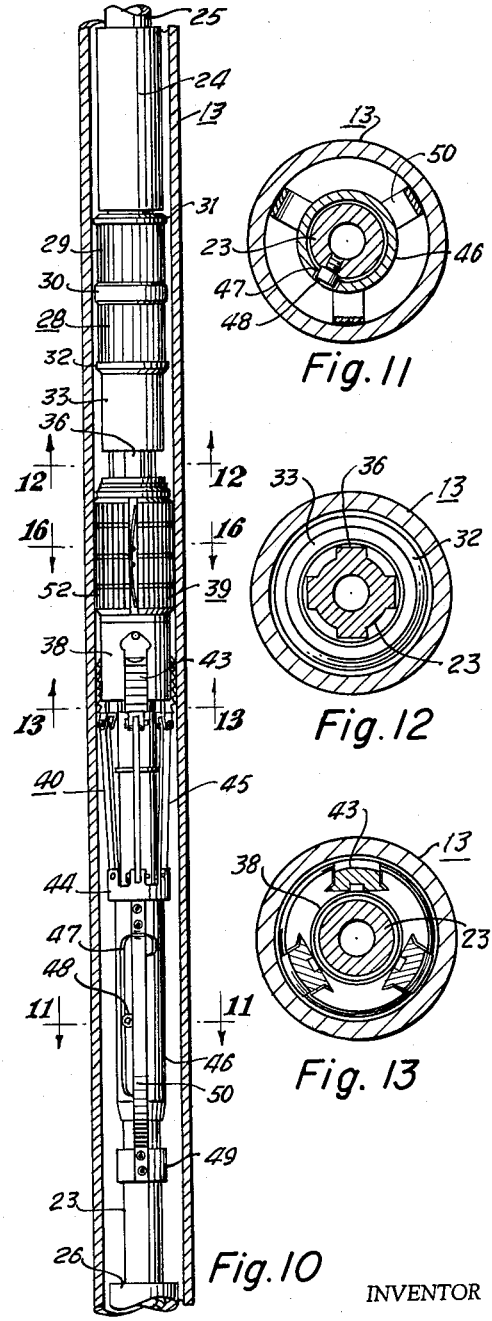

Sept. 22, 1964   H. W. ENSMINGER   3,149,676
APPARATUS FOR TESTING AND REPLACING DEFECTIVE WELL CASING
Filed July 20, 1961   5 Sheets-Sheet 5
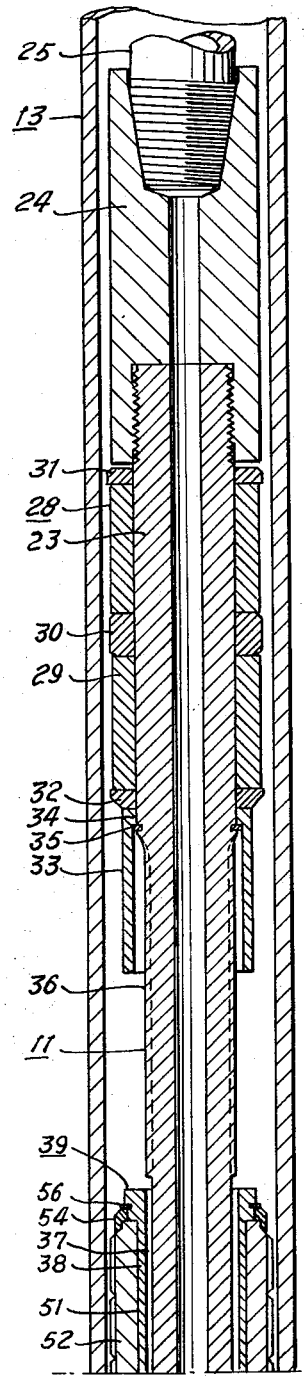
Fig. 14
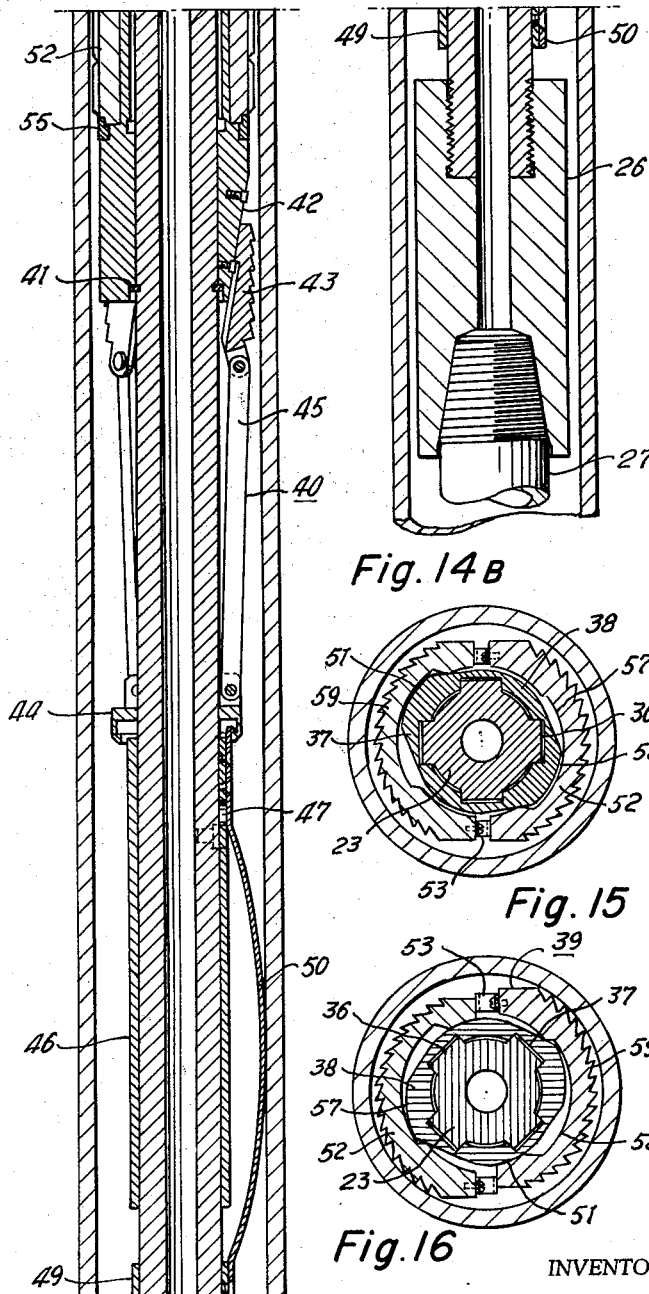
Fig. 14A
Fig. 14B
Fig. 15
Fig. 16
INVENTOR
Harvey W. Ensminger
BY Ehley & Ehley
ATTORNEYS

United States Patent Office 3,149,676
Patented Sept. 22, 1964

3,149,676
APPARATUS FOR TESTING AND REPLACING DEFECTIVE WELL CASING
Harvey W. Ensminger, Kilgore, Tex., assignor to A. Z. Skeeters, Longview, Tex.
Filed July 20, 1961, Ser. No. 125,519
7 Claims. (Cl. 166—67)

This invention relates to new and useful improvements in apparatus for testing and replacing defective well casing.

One object of the invention is to provide an improved apparatus for testing and replacing casing in a well bore without removing the apparatus from the well bore.

A particular object of the invention is to provide an improved apparatus for testing and replacing defective well casing having means for packing off between the apparatus and casing to permit testing of the casing for leaks and accurate location of the defective portion prior to removal thereof.

An important object of the invention is to provide an improved apparatus, of the character described, having expansible packing and gripping means movable longitudinally through the casing and adapted to be actuated by manipulation of the apparatus whereby the packing means may be positioned and expanded into sealing engagement with the casing to locate the defective portion thereof and then released to permit expansion of the gripping means for disconnecting the defective casing from the remainder thereof.

Another object of the invention is to provide an improved apparatus, of the character described, having common means for actuating the packing and gripping means whereby the latter may be readily expanded into and released from engagement with the casing with minimum manipulation of the apparatus.

An object of the invention is to provide an improved apparatus, of the character described, having means for positively connecting the apparatus to the casing in order to support the weight of the casing during coupling and uncoupling thereof.

Another object of the invention is to provide an improved apparatus, of the character described, which is adapted to be utilized in positioning and setting a packer for shutting off communication between the casing and the producing formation.

A further object of the invention is to provide an improved apparatus, of the character described, having means for spanning the disconnected joint of the casing to facilitate alinement of the replaced casing with the remainder of the casing.

A construction designed to carry out the invention will be hereinafter described, together with other features of the invention.

Figure 1A:
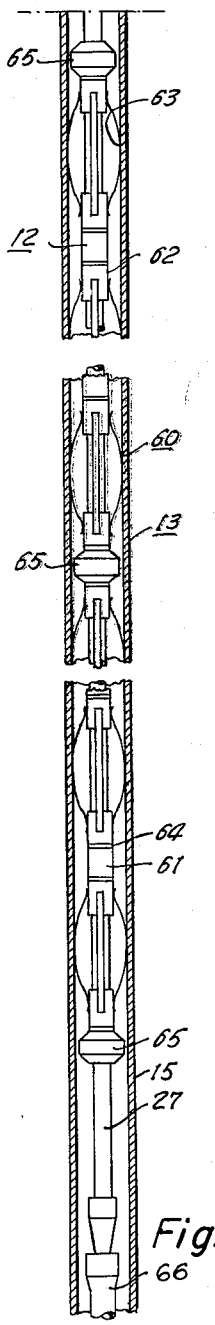
Figure 1B:
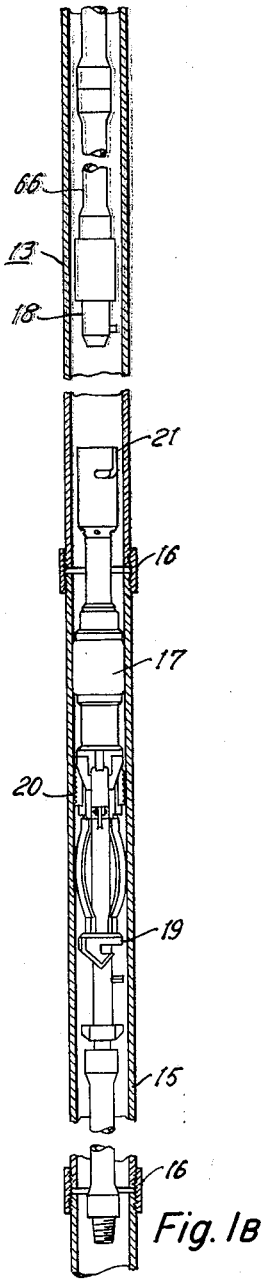

The invention will be more readily understood from a reading of the following specification and by reference to the accompanying drawings, wherein an example of the invention is shown, and wherein:

FIGS. 1, 1A and 1B are views, partly in section and partly in elevation, of an apparatus constructed in accordance with the invention and positioned within a well casing and shown disconnected from the packer, FIG. 1 illustrating the upper portion, FIG. 1A the intermediate portion and FIG. 1B the lower portion of the apparatus, FIG. 2 is a view, similar to FIG. 1, showing the packing means of the apparatus expanded into sealing engagement with the casing, FIG. 3 is a view, similar to FIG. 1, showing the gripping means of the apparatus expanded into engagement with the casing and the holddown means for connecting said apparatus to the casing, the upper portion of said casing being disconnected from the lower portion thereof, FIG. 4 is a view, similar to FIG. 1, showing the support for the casing during its removal, the apparatus being supported in the casing remaining in the well bore, FIG. 5 is a view, similar to FIG. 3, showing the replacement of the casing and the testing thereof, FIG. 5A is a continuation of FIG. 5, showing the alining means of the apparatus prior to reconnection of the casing.

FIG. 6 is a perspective view of the holddown means, portions of the apparatus and casing being shown in broken lines, FIG. 7 is a plan view of the holddown means, FIG. 8 is an enlarged view, similar to FIG. 1, showing the packing and gripping means of the apparatus in retracted, running position, FIG. 9 is a view, similar to FIG. 1, showing the packing means of the apparatus expanded, FIG. 10 is a view, similar to FIG. 1, showing the gripping means of the apparatus expanded, FIG. 11 is an enlarged, horizontal, cross-sectional view, taken on the line 11—11 of FIG. 10, FIG. 12 is a view, similar to FIG. 11, taken on the line 12—12 of FIG. 10, FIG. 13 is a view, similar to FIG. 11, taken on the line 13—13 of FIG. 10, FIGS. 14, 14A and 14B are enlarged, longitudinal, sectional views, taken on the line 14—14 of FIG. 8, FIG. 14 showing the upper portion, FIG. 14A the intermediate portion and FIG. 14B the lower portion of the packing and gripping means of the apparatus, FIG. 15 is an enlarged, horizontal, cross-sectional view, taken on the line 15—15 of FIG. 8, and FIG. 16 is a view, similar to FIG. 15, taken on the line 16—16 of FIG. 10 and showing the gripping means expanded.

In the drawings, the numeral 10 designates an apparatus for testing and replacing defective well casing and includes a combination testing and back-off tool 11 from which a line-up assembly 12 may depend. The apparatus 10 is adapted to be lowered into a well casing 13, having a casing head 14 at its upper end and its sections 15 coupled by collars 16, and may be utilized to position a plug packer 17 in the casing above its communication with the producing formation. As shown in FIG. 1B, a combination wash nipple and setting tool 18 is mounted on the lower end of the line-up assembly 12 for detachable connection with the plug packer 17 which is of the conventional hook-wall type and which is set by clockwise rotation and downward movement to release its pin and slot latch 19 and expand its slips 20 into engagement with the casing. After setting of the packer, the apparatus is turned to the left or counter-clockwise and raised to disengage the pin and slot type latch 21, which connects the setting tool and packer, so as to permit movement of said apparatus independently of said packer. It is noted that the packer 17 may be positioned by other means since its only purpose is to close the lower portion of the casing and prevent its communication with the producing formation. Also, any type of suitable packer or closing means may be employed. As will be explained and as shown in FIGS. 3 and 5, the apparatus may include a holddown device 22 at the surface for connecting said apparatus to the casing.

The combination testing and back-off tool 11 is shown most clearly in FIGS. 14–14B and includes an elongate, tubular supporting member or mandrel 23 attached by a coupling 24 to the lower end of left-hand drill pipe or well tubing 25 for suspending said apparatus in the well casing 13. A similar coupling 26 connects the lower end of the mandrel 23 to a similar mandrel 27 which forms a part of the line-up assembly 12 (FIGS. 1 and 14B). Packing means 28, having a pair of cylindrical bodies or elements 29 of elastic material, is slidably mounted on the upper end portion of the mandrel 23 of the tool 11 for distortion into sealing engagement with the casing. A metallic ring 30 separates the packing elements 29 and similar rings 31 and 32 overlie and underlie said elements. For distorting the packing elements, a cylindrical collar 33 is slidably confined upon the mandrel below the lower ring 32 by an internal, annular flange or shoulder 34 at its upper end overlying an enlargement or snap ring 35 on said mandrel. The mandrel 23 is reduced in diameter below the packing means 28 and has a plurality of keys or splines 36 extending longitudinally thereof for slidable engagement by the internal, longitudinal channels or ways 37 of the cylindrical body or housing 38 of casing gripping means 39 (FIGS. 15 and 16). A slip assembly 40 is mounted on the lower portion of the mandrel to prevent downward movement of the gripping means 39 and permit relative downward movement of the packing means and mandrel and distortion of the packing elements 29 into sealing engagement with the casing (FIGS. 3 and 5).

As shown in FIG. 14A, the gripping means housing 38 is supported by an underlying snap ring or enlargement 41 on the mandrel 23 and has inclined lands 42 on the exterior of its lower end portion for coacting with the toothed slips 43 of the assembly 40. A collar or ring 44 encircles the mandrel and is pivotally attached to the lower ends of the slips 43 by links or reins 45 so as to support said slips for sliding movement relative to the lands 42. Below the ring 44, the mandrel has a cylindrical member or sleeve 46 rotatably and slidably mounted thereon and movably fastened thereto by an inverted J slot 47 in the sleeve and a pin 48 on said mandrel (FIGS. 8 and 11). A collar or ring 49 encircles the mandrel below the sleeve 46 and is connected to the upper end of said sleeve by outwardly-bowed, leaf springs or resilient elements 50 which frictionally engage the casing 13 to resist movement of said sleeve. Due to this frictional engagement, the mandrel may be turned and moved longitudinally relative to the sleeve 46 for expanding and retracting the slips 43 into and out of engagement with the casing. When the slips are expanded, the mandrel may be lowered relative to the gripping means 39 so as to move the lower end of the collar 33 into engagement with the upper end of the housing 38. The ways 37 mesh with the splines 36 (FIG. 16) and continued downward movement of the mandrel distorts the packing elements 29 into sealing engagement with the casing. Upon upward relative movement of the mandrel, the collar 33 is moved out of engagement with the housing 38 to permit retraction of the packing elements and said housing is raised when engaged by its supporting ring 41 and its lands 42 are moved upwardly to permit retraction of the slips.

The major medial portion of the gripping means housing 38 is reduced in diameter to provide an external, elongate recess 51 for receiving a pair of opposed, semi-cylindrical wrench members 52 which are urged apart by bowed leaf springs 53 secured to the adjacent longitudinal margins of the wrench members. Annual retainer cups 54 and 55 are suitably mounted on the housing at the ends of its recess 51 for overlying the reduced ends of the wrench members, the upper retainer cup 54 being removably confined on said housing by a snap ring 56. As shown in FIGS. 15 and 16, the recess and wrench members 52 have coacting cam surfaces 57 and 58 for expanding said members into engagement with the casing upon counterclockwise rotation of the housing 38 relative to said members. A plurality of teeth or serrations 59 extend longitudinally of the wrench members for biting or gripping the casing whereby counter-clockwise rotation may be imparted to said casing when said members are expanded. In order to impart rotation to the housing by the mandrel 23, said mandrel is lowered relative thereto so as to mesh the ways 37 with the splines 36 as shown in FIGS. 3, 10, 15 and 16.

The line-up assembly 12 includes a plurality of resilient centralizers 60 rotatably confined on its tubular mandrel 27 between cylindrical spacers or collars 61 which are welded or otherwise secured to the mandrel (FIGS. 1A and 5A). Each centralizer 60 has a pair of cylindrical end members or collars 62 which are connected by longitudinal, outwardly-bowed leaf springs or resilient elements 63 adapted to frictionally engage the casing 13. Preferably, annular bearings or loose rings 64 are interposed between the collars 61 and 62. At the upper, lower and medial portions of the assembly, rigid, cylindrical centralizers 65 are welded or otherwise fixed to the mandrel in place of the spacer collars and are of less diameter than the internal diameter of the casing so as to be spaced therefrom. As shown by the numeral 66 in FIGS. 1A and 1B, a considerable length of pipe or tubing may be interposed between the setting tool 18 and mandrel 27 of the line-up assembly.

The holddown device 22 includes an upright, cylindrical body or housing 67 having a pair of semi-cylindrical sections 68, each of which is formed by an arcuate or semi-circular bottom plate 69, a complementary slip spider segment 70 and a pair of upright, spaced bars or members 71 welded to and connecting the bottom plate and spider segment. As shown in FIGS. 6 and 7, the bottom plates 69 are suitably hinged at 72 and the segments 70 are hinged at 73 and arranged to be latched together at 74 for connecting the housing sections 68 around the casing 13 and pipe 25. A split adapter ring 75 may be fastened by screws 76 to the bottom plates to reduce the diameter of the opening formed by said plates in accordance with the diameter of the casing. The upright bars 71 have ears or lugs 77 extending radially inward of their intermediate portions for bearing against a coupling collar 78 which is substituted for the casing head 14 and which is adapted to overlie the bottom plates of the housing 67. Usually, it is necessary to provide a casing section or torque nipple 79, of the proper length, at the upper end of the casing in order to position said upper end above the ground sufficiently to permit connection of the holddown device thereto. The inner surfaces of the spider segments 70 are tapered to form an inverted or downwardly-facing bowl 80 for receiving a pair of semi-circular slips 81 having internal teeth 82 which are arranged to grip and prevent upward relative movement of the pipe 25. Suitable levers 83 are pivotally attached to the lower ends of the slips 81 for raising and lowering said slips into and out of engagement with the bowl 80 and, as shown at 84, are pivotally mounted on an opposed pair of the bars 71 and extend through openings therein. Since the lugs 77 of the holddown device rest on the upper end of the casing, the pipe is connected to said casing when the slips are raised into engagement with the bowl so as to prevent upward movement of said pipe when pressure fluid is introduced into said casing to test it for leaks. Primarily, the holddown device is adapted to permit supporting of the casing by the pipe when said casing is being uncoupled, raised, lowered and recoupled.

For sake of economy, it is desirable to leave the apparatus in the casing when removing and replacing the defective portion of said casing (FIG. 4). Accordingly, the apparatus is adapted to be supported by the slip assembly 40 in the casing below its defective portion and said defective portion is replaced by being threaded over the pipe 25. A suitable ground or surface support 85 is provided for the casing and is shown as being in the form of a base member or plate 86 reinforced by beams 87 and having a slip spider 88 mounted thereon for receiving suitable slips 89 (FIGS. 3–5). The casing extends through the spider 88 and is freely movable when the slips 89 are disengaged from said spider. The surface support 85 is placed in position after removal of the casing head 14 so as to be available for use at any time during the testing and replacing of defective well casing.

In order to replace the defective casing, it is necessary to locate the defective portion or portions thereof and this is accomplished by applying fluid under pressure to the interior of said casing. As shown in FIGS. 1–1B, the apparatus 10 is assembled and lowered through the well casing 13 by the pipe 25 to position and set the packer 17 below the defective portion of the casing for shutting off communication between the producing formation and casing so as to permit the building up of pressure within said casing. Upon disconnection of the setting tool 18 from the packer, the apparatus is raised a distance equal to the length of several sections or joints 15 of the casing and rotated approximately one-quarter of a turn to the right or clockwise to move the pin 48 of the mandrel 23 into alinement with the vertical leg of the slot 47 as well as aline the splines 36 of said mandrel with the ways 37 of the gripping means housing 38. This relative rotation is made possible by the frictional engagement of the leaf springs 50 of the slip assembly 40 with the casing, which engagement also resists longitudinal movement of the slip assembly and permits relative downward movement of the mandrel for setting the slips 43 to support and prevent downward movement of the gripping means 39. The splines and ways mesh and the collar 33 is lowered into engagement with the upper end of the housing 38 to distort the packing elements 29 by this downward movement of the mandrel (FIGS. 2 and 9). Fluid under pressure is then supplied to the pipe 25 by a suitable pump (not shown) and flows into the casing above the packer 17 through the mandrels 23 and 27 and the nipple of the setting tool 18.

Upon completion of the test, the mandrel is raised to permit retraction of the slips 43 and packing elements 29 and upward movement of the apparatus for testing the casing joints or section thereabove. Each section is tested in the same manner until the defective section or sections are located, a defect being indicated by loss of pressure due to leakage. Preferably, the packer 17 is tested for leaks by setting the packing means 28 immediately after disconnecting the tool 18 from said packer and before commencing the testing of the casing. Also, it is desirable to displace oil and water from the casing above the packer by introducing mud through the apparatus after testing said casing. After the defective portion or portion of the casing have been located, the casing head 14 is removed and the surface support 85 is placed in position. Also, the torque nipple 79 may be connected to the upper end of the casing or substituted for the uppermost section thereof. It is noted that the holddown device 22 may be utilized to prevent upward movement of the apparatus during testing of the casing. In the event that this is desirable, the casing head may, but need not, be removed and the surface support substituted therefor before commencing the testing operation. As has been pointed out, the slips 81 prevent upward movement of the pipe 25 when the holddown device is connected to the torque nipple.

After relatching the slip assembly 40 in retracted position by clockwise or right-hand rotation, the apparatus is lowered until the gripping means 39 is below the lowermost defective section of casing and then is raised slightly to set the slips 43 and mesh the splines 36 and ways 37 but without distorting the packing elements 29 (FIG. 10). Counter-clockwise or left-hand rotation is imparted to the mandrel 23 to turn the housing 38 and its cam surfaces 57 relative to the wrench members 52 and their cam surfaces 58 for expanding the teeth of said members into engagement with the casing (FIG. 16). At this point, the holddown device 22 is mounted around the torque nipple 79 and its slips 81 are engaged with the pipe 25 to secure said pipe to the casing and permit supporting of the weight of said casing by said pipe. Elevators or other suitable means (not shown) are secured to the pipe for supporting this weight. Continued counter-clockwise rotation of the mandrel turns the entire apparatus and the section of the casing engaged by the wrench members 52 as well as the casing sections thereabove. Due to the holddown device, the weight of the casing is supported to facilitate unscrewing of one of its couplings below the gripping means and prevent damaging of the threads of the joint being broken (FIG. 3). When the coupling is unscrewed, the disconnected casing is lifted and supported in the slips 89 of the surface support 85 to permit removal of the holddown device 22. Then, the mandrel 23 is turned clockwise or to the right for releasing the wrench members 52 and said mandrel is raised to retract the slips 43 so that the apparatus may be lowered and supported in the casing which remains in the well bore, the latch assembly being relatched by clockwise or right-hand rotation. As shown in FIG. 4, the pipe 25 extends above the surface and the removed casing is threaded thereover when the apparatus is supported in the lower or remaining portion of said casing by counter-clockwise rotation and downward movement of the mandrel 23 relative to the slip assembly.

Replacement of the casing is illustrated in FIGS. 5 and 5A wherein the line-up assembly 12 is utilized to aline the replaced casing with the casing in the well bore. After the replaced casing is threaded over the pipe 25, the slips 89 of the spider 88 are inserted to support said casing and the apparatus is disconnected from the casing in the well bore and raised until the line-up assembly spans the space between said casing and the replaced casing (FIG. 5A). The proper length of casing section is screwed on the upper end of the casing and the holddown device 22 is mounted therearound to secure the casing to the pipe. Upon removing the slips 89, the replaced casing is lowered into engagement with the casing in the well bore and supported by the holddown during connection of said casing. As shown in FIG. 5, this connection may be tested by setting the packing means 28 in the replaced casing above said connection. The holddown device is then removed and the apparatus lowered for reconnection of the setting tool 18 with the packer 17 and removal of said packer by upward movement of said apparatus. After withdrawal of the apparatus, the surface support 85 is removed and the casing head 14 replaced.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:
1. An apparatus for replacing defective well casing in a well bore including a combination testing and back-off tool adapted to be lowered into the well casing on a well pipe, the tool having a supporting member adapted to be connected to the lower end of the well pipe, packing means mounted on the supporting member for sealing engagement with the casing, casing gripping means slidably mounted on said member below the packing means, a slip assembly slidably mounted on said member below the casing gripping means for limited movement relative to said member and adapted to be set in gripping engagement with the casing upon relative downward movement of said member to support said gripping means whereby said packing means is distorted into sealing position by downward movement with said member into engagement with said gripping means, the slip assembly having casing engaging means for resisting movement of said assembly, a wrench member on said gripping means for gripping engagement with the casing, and means forming a part of said gripping means and movable with said supporting means relative to the wrench member for setting said wrench member in engagement with the casing whereby rotation of said supporting member imparts rotation to the casing so as to separate the same, said gripping means including a housing slidably and rotatably confined on said supporting member and adapted to be engaged with said packing means for distorting the same into sealing position, said housing and supporting member having coacting means for securing said housing against relative rotation, said wrench member being mounted on said housing, and means between said housing and wrench member for expanding said wrench member into gripping engagement with the casing on rotation of said supporting member.

2. An apparatus as set forth in claim 1 wherein the coacting means for connecting the housing against rotation relative to the supporting member includes splines extending longitudinally of said member.

3. An apparatus as set forth in claim 1 wherein the means for expanding the wrench member includes a cam surface between the housing and wrench member.

4. An apparatus for replacing defective well casing in a well bore including a mandrel adapted to be lowered into the well casing on the lower end of well pipe, a slip assembly slidably mounted for limited movement on the mandrel and adapted to be set in gripping engagement with the casing upon relative downward movement of said mandrel, the slip assembly having casing engaging means for resisting movement of said assembly, a housing slidably and rotatably confined on said mandrel above the slip assembly and adapted to be supported by said assembly upon relative downward movement of said mandrel, a splined connection between the housing and mandrel engageable by relative downward movement of said mandrel to secure said housing against relative rotation, wrench members on said housing expandible for gripping engagement with the casing, and cam means between the wrench members and housing for expanding said members upon rotation of said housing with said mandrel to engage and impart rotation to the casing for separating the same.

5. An apparatus as set forth in claim 4 including packing mounted on the mandrel above the housing and adapted to be distorted into sealing engagement with the casing upon downward movement with said mandrel into engagement with said housing.

6. An apparatus as set forth in claim 4 including a holddown device for connecting the well casing to the well pipe above the well bore to permit supporting of the weight of the casing by the well pipe during separation of the casing.

7. An apparatus as set forth in claim 4 including a casing line-up assembly suspended from the lower end of the mandrel for spanning the space between the separated casing, and radial means on the assembly for engaging the inner wall of the casing.

References Cited in the file of this patent
UNITED STATES PATENTS

| | | |
|---|---|---|
| 1,389,710 | Thomas et al. | Sept. 6, 1921 |
| 2,848,050 | Woolley | Aug. 19, 1958 |